United States Patent

[11] 3,547,387

| [72] | Inventor | Geoffrey William Hedges Stevens<br>Camberley, England |
|---|---|---|
| [21] | Appl. No. | 697,910 |
| [22] | Filed | Jan. 15, 1968 |
| [45] | Patented | Dec. 15, 1970 |
| [73] | Assignee | National Research Development Corporation<br>London, England |

[54] SHOCK ABSORBING DEVICES
5 Claims, 6 Drawing Figs.

[52] U.S. Cl. .................................................. 248/119; 297/386
[51] Int. Cl. .................................................. B66f 9/00
[50] Field of Search .......................................... 248/119, 205, 205A; 297/216, 386, 385, (Velcro Digest); 188/1C; 244/138; 139/397

[56] References Cited
UNITED STATES PATENTS

| 1,379,931 | 5/1921 | Ott ........................ | 139/397 |
| 2,072,152 | 3/1937 | Blake ..................... | 139/397X |
| 2,356,456 | 8/1944 | Garner ................... | 139/397X |
| 1,838,795 | 12/1931 | Thompson .............. | 108/51 |
| 1,935,339 | 11/1933 | Tricau .................... | 297/386X |
| 2,352,036 | 6/1944 | Tauty ..................... | 297/386X |
| 2,454,616 | 11/1948 | Schultz ................... | 244/138 |
| 2,474,124 | 6/1949 | Schultz ................... | 297/386X |
| 2,475,588 | 7/1949 | Bierman ................. | 297/386X |
| 2,557,105 | 6/1951 | Hight ..................... | 188/1C |
| 2,637,368 | 5/1953 | Cotton ................... | 297/216 |
| 3,203,361 | 8/1965 | Sharp ..................... | 248/119 |
| 3,241,881 | 3/1966 | Carnahan ............... | 297/385 |
| 3,328,081 | 6/1967 | Scruggs .................. | 297/385 |

FOREIGN PATENTS

| 1,015,298 | 12/1965 | Great Britain ........... | 297/385 |

*Primary Examiner*—Francis K. Zugel
*Attorney*—Larson & Taylor

ABSTRACT: The invention relates to shock absorbing devices, particularly for use for the absorption of shock when equipment dropped from an aircraft contacts the ground and in safety harness equipment.

A shock absorbing device comprises a fabric material having two opposed plays or face layers which are joined to each other by interconnecting pile members, the one face layer to be secured to a load to be protected and the other face layer to be secured to a support whereby said shock absorbing device, at least in part, normally supports said load in said support and wherein the onset of a shock load which results in relative movement between said load and said support is resisted by tearing of the interconnecting pile members.

SHOCK ABSORBING DEVICES

This invention relates to shock absorbing devices.

The invention is particularly related to shock absorbing devices for use in two fields of work, the one being the absorption of shock when equipment dropped from the air, for example, a parachute supported load, hits the ground and the other being in safety harness equipment which is now commonly provided for the occupants of aircraft and motor vehicles.

The object of the invention is to provide a shock absorbing device which will, at least to some extent, support a load to an acceptable level of shock and will act to absorb excess shock when this level is exceeded and thus protect the load.

According to the present invention a shock absorbing device comprises a fabric material having two opposed plys or face layers which are joined to each other by interconnecting pile members, the one face layer to be secured to a load to be protected and the other face layer to be secured to a datum frame, wherein the onset of a shock load which would result in relative movement between the load and the frame is resisted by tearing or ripping of the interconnecting pile members.

In one arrangement according to the invention the fabric material comprises an uncut velvet-type pile fabric.

In a further preferred arrangement the fabric material may comprise a double webbing woven with interconnecting threads joining the two facing webs together.

Thus the fabric material comprises a webbing or broadloom cloth in which the warp threads are patterned to give three groups, one group to form one face ply or layer, another to form the second face ply or layer and the third to bind the two plys together. This pattern may be built up on a loom using a single weft shuttle but there is an advantage in having twin shuttles, one weaving in each face as is known in the weaving art, as this enables the weaving programme to be changed at selected positions along the fabric to weave regions having unconnected face plys, which regions for example facilitate securement of the fabric to a load and frame.

Undrawn or partly drawn fibres are preferably used for the pile members because of their desirable straining characteristics but drawn fibres whose specific energy to rupture is high may be used. For example, partly drawn and plasticised fibres may be used and these have the added advantage of retaining their good strain characteristics at low temperature.

Preferably, the pile is precut to provide a region of weakness which leads to propagation of the tear in a desired manner. A cutting device may also be incorporated which is operative immediately after the occurrence of a shock load to initiate tearing of the pile members.

One arrangement according to the invention for use with a store to be dropped from an aircraft for descent by parachute to the ground is illustrated by the accompanying diagrammatic drawings of which:

Figure 4:
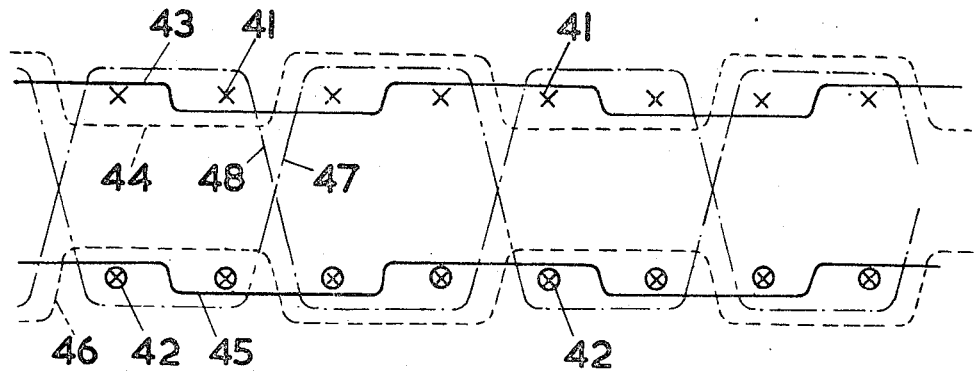
Figure 5:
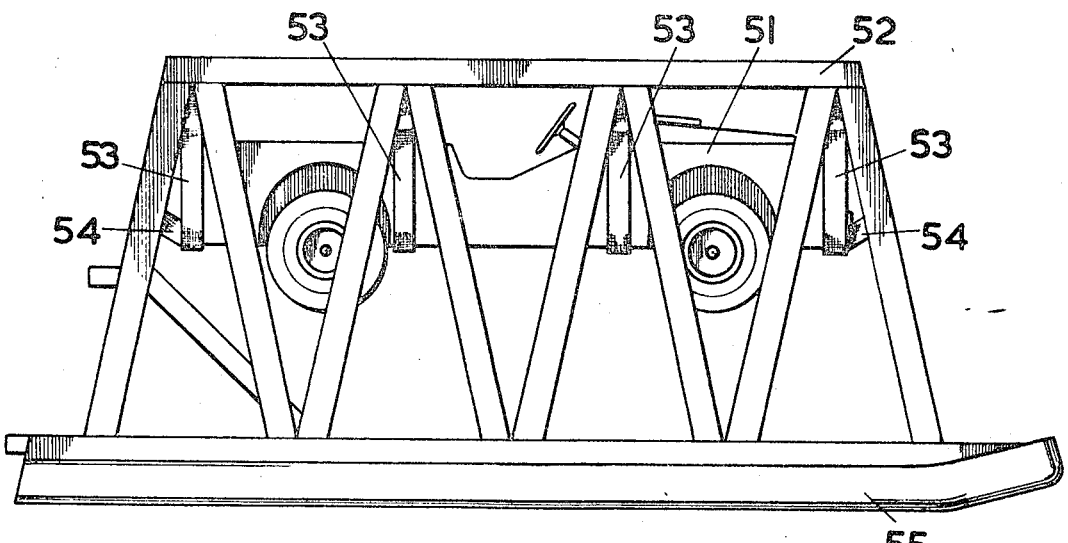
Figure 6:
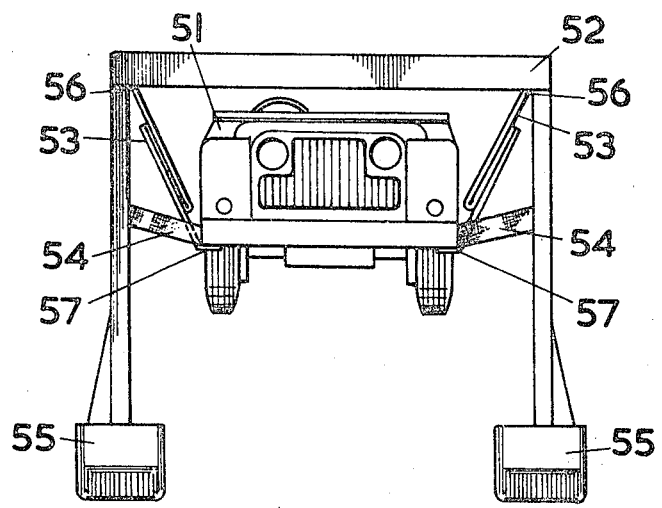

FIG. 4 accompanying this specification illustrates an example of the weave construction of webbing material for use in accordance with the invention while; and FIGS. 5 and 6 of the accompanying drawings are side and end views respectively of a store carrier having a further example of a shock absorbing device according to the invention for use in the very low-level dropping of stores from aircraft.

Figure 1:
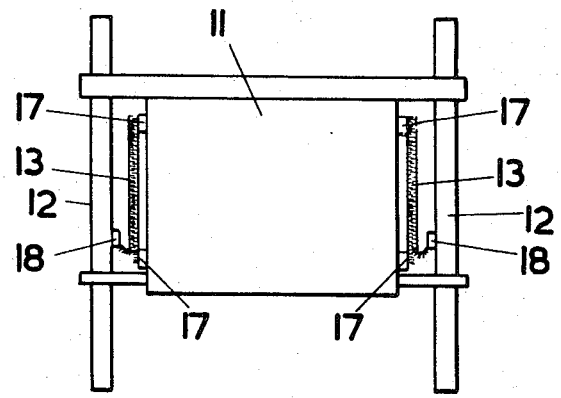
FIG. 1 is an end view.
Figure 2:
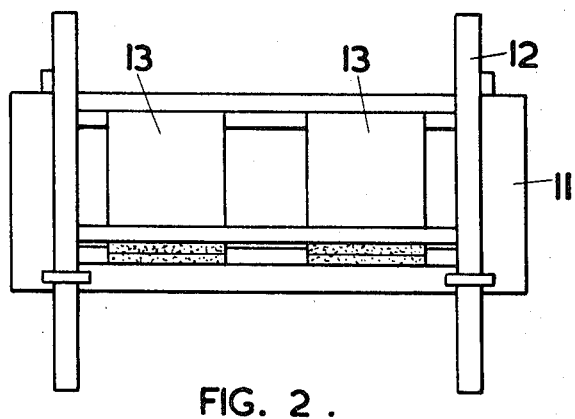
FIG. 2 is a side view.
Figure 3:
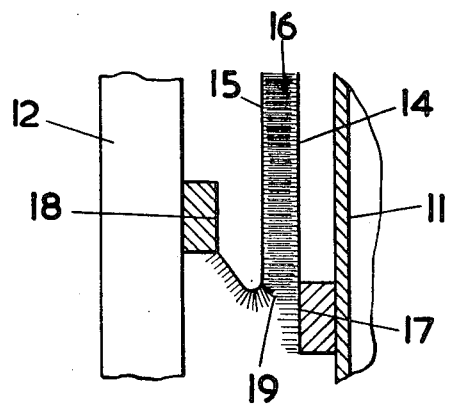
FIG. 3 is a detail side view.

As shown at FIGS. 1, 2 and 3 of the drawings a store 11 is supported in a carrier frame 12 by interconnecting velvet pile fabric material 13. As shown at FIG. 3, the material 13 has two face layers 14 and 15 and interconnecting pile members 16. The one face layers 14 are secured to the store by adhesive as at 17, 17 and the other face layers 15 are secured to the carrier frame 12 at 18, 18. The pile members are cut as at 19 prior to use.

In operation, after descent by parachute the carrier 12 strikes the ground. The transmission of this impact to the store 11 is resisted by the tearing or ripping of the pile members so that the store 11 is not suddenly arrested.

A similar arrangement may be used for mounting a seat in an aircraft and is particularly useful for mounting a seat in a helicopter. In this arrangement the seat takes the place of the store 11 referred to above and sudden jarring of the seat is reduced in the case of a heavy landing.

In a further arrangement (not shown) according to the invention for use as a safety harness in a motor vehicle, the one face layer of a double faced layer pile material is secured to the vehicle whilst the other is connected to or comprises the occupant-enveloping portion of the harness and in the event of a sudden shock load as may occur as a result of a collision, any over abrupt arresting of the movement of an occupant wearing the harness is resisted by tearing or ripping of the pile members.

Fabric material in nylon, polyester or nomex and composites involving highly drawable polymers such as the polyolefines can be fabricated.

The weave construction of a fabric material according to the invention is illustrated by the accompanying FIG. 4 which is a side view of the webbing. As shown, the upper weft threads are shown at 41, 41 and the lower weft threads at 42, 42. The upper face layer warp threads are shown at 43 and 44 and the lower face layer warp threads are shown at 45 and 46. The pile threads or binders which interconnect the two face layers or plys are shown at 47 and 48.

In one example a fabric material was made from nylon in the form of a double faced webbing having interconnecting pile members having a width across the faces of about 1¾ and it was found that 30 ft. of this webbing weighed 1 lb. and that its bulk was similar to parachute harness webbing. On examination it was found that the running tear force to tear the pile threads and separate the face layers was 400 lb. but that at slow rates of tearing it peaked at as much as 700 lb.; the tearing force is more uniform and consistent at the higher tearing speeds. In tearing 1 ft. of this webbing the point of application of load moves through 2 ft. and at least 800 ft. lb. of work are done. Thus, in tearing 1 lb. (30 ft.) of webbing 24,000 ft. lb. of work can be done. This is a very high figure because when divided by the weight of binder warp (interconnecting pile members) in the pound of webbing, the resultant figure is in excess of the specific energy required to break that amount of nylon. The reason for this is that each section of the binder warp goes through a number of load reversals before fracture which cause additional work to be done by a hysteresis effect. In practice the webbing becomes warm to the touch upon tearing and the warp binders show evidence of fuzing.

As shown in FIGS. 5 and 6, a store, in this case a truck 51, is supported in an inverted U-section frame 52 on lengths of shock absorbing fabric material 53, 54 according to the invention. The frame 52 has a pair of landing skids 55, 55 capable of absorbing shock and in this case comprise honeycomb structures.

The frame 52 is carried in an aircraft and the lengths of material 53 carry the main weight of the truck 51 whilst the lengths of material 54 resist lateral and for and aft swinging of the truck within the frame. In each case one face layer or ply is secured to the frame and the other is secured to the truck as at 56 and 57, respectively, whereby the load is carried by the pile members of the fabric.

In operation the frame carrying the truck is withdrawn from the aircraft whilst flying at very low level about 30 ft. by means of a parachute (not shown) which functions almost wholly to decelerate the forward movement of the frame and which has little, if any, effect in retarding the downwards acceleration of the frame. When the frame strikes the ground the initial impact is absorbed by crushing of the honeycomb structures in the well-known manner. The impact load is then transferred through the frame 52 to the lengths of material 53, 54 which are of such length that they tear completely, the pile members affording a shock absorbing function as they tear. The final load is taken by the normal shock absorbing suspension system of the truck. The particular advantage of this arrangement is that the truck is quickly available for use following landing as it does not have to be derigged from the frame although the steering gear may have to be locked before descent and this would then need to be unlocked.

I claim:

1. A shock absorbing device comprising, in combination, a support means, a load supported from and resistably moveable relative to said support means and secured thereto by means of a unitary fabric material, said fabric having two opposed facing plies and interconnecting pile threads woven as part of both of said plies and extending back and forth between the plies joining the plies together, means securing a portion of one ply to said support means, and means securing a portion of the other ply adjacent said portion of said first ply to said load whereby the onset of a shock load above a predetermined amount causes the interconnecting pile threads to tear beginning at a point adjacent the portions of said plys secured to said support means and load to thereby resist movement of said load relative to said support means.

2. A shock absorbing device according to claim 1 wherein said interconnecting pile threads are warp threads.

3. A shock absorbing device according to claim 1 wherein said interconnecting pile threads are selected from the group consisting of undrawn, partly drawn and drawn fibres and in which the fabric material comprises synthetic polymer thread.

4. A shock absorbing device according to claim 1 wherein said interconnecting pile threads are selected from the group consisting of nylon, polyester and polyolefin threads.

5. A shock absorbing device according to claim 1 wherein said support means comprises a U-section frame.